United States Patent
Brix et al.

(10) Patent No.: US 9,096,460 B2
(45) Date of Patent: Aug. 4, 2015

(54) LITHIUM ALUMINOSILICATE GLASS WITH HIGH MODULUS OF ELASTICITY, AND METHOD FOR PRODUCING SAME

(75) Inventors: Peter Brix, Mainz (DE); Wolfram Beier, Essenheim (DE); Jochen Alkemper, Klein-Winternheim (DE)

(73) Assignee: SCHOTT AG, Mainz (DE)

( * ) Notice: Subject to any disclaimer, the term of this patent is extended or adjusted under 35 U.S.C. 154(b) by 415 days.

(21) Appl. No.: 13/581,378

(22) PCT Filed: Feb. 24, 2011

(86) PCT No.: PCT/EP2011/000888
§ 371 (c)(1),
(2), (4) Date: Nov. 9, 2012

(87) PCT Pub. No.: WO2011/104018
PCT Pub. Date: Sep. 1, 2011

(65) Prior Publication Data
US 2013/0186140 A1   Jul. 25, 2013

(30) Foreign Application Priority Data

Feb. 26, 2010   (DE) .................. 10 2010 009 585

(51) Int. Cl.
| | | |
|---|---|---|
| C03C 3/083 | (2006.01) |
| C03C 3/087 | (2006.01) |
| C03C 21/00 | (2006.01) |
| C03C 3/097 | (2006.01) |
| C03C 3/112 | (2006.01) |
| C03B 18/02 | (2006.01) |
| C03B 27/012 | (2006.01) |

(52) U.S. Cl.
CPC .............. *C03C 3/097* (2013.01); *C03B 18/02* (2013.01); *C03B 27/012* (2013.01); *C03C 3/083* (2013.01); *C03C 3/112* (2013.01); *C03C 21/00* (2013.01); *C03C 21/002* (2013.01)

(58) Field of Classification Search
CPC ........ C03C 3/083; C03C 3/085; C03C 3/087; C03C 3/097; C03C 21/00; C03C 21/002
USPC ........... 501/63, 68, 69, 70; 65/30.14, 95, 99.2
See application file for complete search history.

(56) References Cited

U.S. PATENT DOCUMENTS

| 6,187,441 | B1 | 2/2001 | Takeuchi et al. |
| 2008/0020919 | A1 | 1/2008 | Murata |
| 2009/0142568 | A1 | 6/2009 | Dejneka |

FOREIGN PATENT DOCUMENTS

| DE | 4206268 | A1 | 11/1992 |
| DE | 102004022629 | A1 | 12/2005 |
| EP | 2075237 | A1 | 7/2009 |
| JP | H1072238 | A | 3/1998 |
| JP | H10124841 | A | 5/1998 |
| JP | H10241134 | A | 9/1998 |
| JP | 2002174810 | | 6/2002 |
| JP | 2008001590 | A | 1/2008 |
| JP | 2008115072 | | 5/2008 |
| JP | 2009013052 | A | 1/2009 |
| JP | 2009280478 | A | 12/2009 |
| JP | 2013520385 | A | 6/2013 |
| WO | 2008/149858 | | 12/2008 |

OTHER PUBLICATIONS

European Office Action dated Feb. 25, 2014 corresponding to European Patent No. 11 706 179.6, 7 pp.
International Search Report dated Jun. 9, 2011 corresponding to International Patent Application No. PCT/EP2011/000888.
International Preliminary Report on Patentability dated Nov. 6, 2012 corresponding to PCT/EP2011/000888, with English translation, 11 pp.
Written Opinion of the International Searching Authority dated Jun. 9, 2011 corresponding to PCT/EP2011/000888, with English translation, 10 pp.
Chinese Office Action dated Jun. 3, 2014 corresponding to Chinese Application No. 201180011289.1, with English translation, 11 Pages.
Japanese Office Action dated Aug. 5, 2014 corresponding to Japanese Application No. 2012-554246, with English translation, 4 Pages.

*Primary Examiner* — Anthony J Green
*Assistant Examiner* — Elizabeth A Bolden
(74) *Attorney, Agent, or Firm* — Ohlandt, Greeley, Ruggiero & Perle, LLP

(57) ABSTRACT

A lithium aluminosilicate glass and a method for producing such lithium aluminosilicate glass are provided. The glass has a composition, in mol %, of: $SiO_2$ 60-70; $Al_2O_3$ 10-13; $B_2O_3$ 0.0-0.9; $Li_2O$ 9.6-11.6; $Na_2O$ 8.2-less than 10; $K_2O$ 0.0-0.7; MgO 0.0-0.2; CaO 0.2-2.3; ZnO 0.0-0.4; $ZrO_2$ 1.3-2.6; $P_2O_5$ 0.0-0.5; $Fe_2O_3$ 0.003-0.100; $SnO_2$ 0.0-0.3; and $CeO_2$ 0.004-0.200. Further, the composition complies with the following relations and conditions: $(Li_2O+Al_2O_3)/(Na_2O+K_2O)$ greater than 2; $Li_2O/(Li_2O+Na_2O+K_2O)$ greater than 0.47 and less than 0.70; $CaO+Fe_2O_3+ZnO+P_2O_5+B_2O_3+CeO_2$ greater that 0.8 and less than 3, where at least four out of the six oxides are included. The glass exhibits a modulus of elasticity of at least 82 GPa and has a glass transition point below 540° C. and/or a working point below 1150° C.

20 Claims, No Drawings

LITHIUM ALUMINOSILICATE GLASS WITH HIGH MODULUS OF ELASTICITY, AND METHOD FOR PRODUCING SAME

The invention relates to lithium aluminosilicate glasses, in particular to lithium aluminosilicate glass articles having a high modulus of elasticity, and to a method for producing such glasses and glass articles.

PRIOR ART

A large number of special glass applications require sheet glass, for example in form of glass panes for viewing windows, window glass, or in displays, but also in form of glass substrates, for example for hard disks or electrical applications. The production of such sheet glass from a glass melt is accomplished by known methods, for example by rolling, drawing, casting, or floating. Due to its high cost effectiveness, floating is widely used.

Usually, soda-lime glasses or aluminosilicate glasses are used for such applications. However, known soda-lime glasses, for example ordinary window glass, and known aluminosilicate glasses such as "Gorilla™" manufactured by Corning Inc., or the glass branded "eXtraDur®" manufactured by Schott AG have a comparatively low modulus of elasticity (Young's modulus) of 72 to 73 GPa and at the same time a comparatively high glass transition point ($T_g$). For example, soda-lime glass typically has a $T_g$ value around 550° C., while eXtraDur typically has a $T_g$ value of about 600° C.

Therefore, these glasses fail to sufficiently meet the demands for substrates which are difficult to deflect (high Young's modulus) on the one hand and which on the other can be processed at low temperatures and can be tempered chemically.

A low temperature for chemical tempering is particularly advantageous because on the one hand it translates into energy savings, and on the other hand it allows adaptation to the melting temperatures of the salts and salt mixtures used for ion exchange. In addition, a low $T_g$ value is also advantageous with regard to the processing of such substrates, for example if they are to be pressed or bent. This is useful both in terms of energy and of lower wear on the materials required for processing the glasses.

From prior art glasses are known which for some properties meet the mentioned requirements, but which have significant drawbacks with respect to other properties mentioned. That is, though glasses exhibiting a high modulus of elasticity are well known, these glasses also have a high $T_g$ value, and/or high working points or cannot be tempered to an optimum, in particular not chemically.

For example, US 2008/0020919 A1 describes tempered aluminosilicate glasses having a $T_g$ value of less than 580° C. and preferably less than 490° C., however with Young's moduli of not more than 77 GPa. Thus, while the glasses have a low $T_g$ value, the achieved moduli of elasticity are not sufficient.

In addition, these aluminosilicate glasses are designed to have a molar ratio of ($Li_2O+Al_2O_3$) to ($Na_2O+K_2O$) which is smaller than two. However, for an exchange of Li ions from the glass for Na ions and/or K ions, a ratio of less than two is not ideal, since in this case the Li ions are under-represented in proportion to the total alkali ion content. In order to be well suited for chemical tempering through an exchange of Li ions, which has significant economic advantages over an exchange of other alkali ions, a higher lithium content is desirable.

JP 20060276510 describes $TiO_2$ containing aluminosilicate glasses which can be chemically tempered. However, due to the predefined $TiO_2$ content, a deep brown coloring Fe—Ti complex may be formed in the glass, especially when iron oxide is to be added intentionally for other reasons. Moreover, $TiO_2$ as a polyvalent ion is unfavorable for manufacturing glasses by a float process, since coatings of $Ti^{4+}$ which is reduced to $Ti^{3+}$ are likely to be formed on the glass surface.

Patent application US 2009/0142568 A1 describes tough and scratch resistant silicate glasses, the strength thereof being achieved by minimizing oxygen atoms which do not form bridge bonds. Alumino-borosilicate glasses are disclosed, which comply with the following relations: 15 mol %≤($R_2O+R'O—Al_2O_3-ZrO_2$)—$B_2O_3$≤4 mol %, wherein R represents Li, Na, K, Rb, or Cs, and R' represents Mg, Ca, Sr, or Ba. However, the glasses explicitly described in this document only achieve a Young's modulus of 76 GPa maximum, which is not sufficient for applications in which high-strength glasses are required.

DESCRIPTION OF THE INVENTION

An object of the invention, therefore, is to provide a glass or glass article having a high modulus of elasticity while exhibiting a low working point and/or glass transition point, and a method for producing such a glass or glass article.

Another object of the invention is to provide such a glass or glass article which can be heavily tempered chemically and/or thermally.

Yet another object of the invention is to provide for cost efficient manufacturing of such glasses or glass articles.

Accordingly, a lithium aluminosilicate glass according to the invention, also referred to as LAS glass below, comprises glasses which have a composition, in mol %, from the following ranges:

| | |
|---|---|
| 60-70 | $SiO_2$ |
| 10-13 | $Al_2O_3$ |
| 0.0-0.9 | $B_2O_3$ |
| 9.6-11.6 | $Li_2O$ |
| 8.2-<10 | $Na_2O$ |
| 0.0-0.7 | $K_2O$ |
| 0.2-2.3 | CaO |
| 0.0-0.4 | ZnO |
| 1.3-2.6 | $ZrO_2$ |
| 0.0-0.5 | $P_2O_5$ |
| 0.003-0.100 | $Fe_2O_3$ |
| 0.0-0.3 | $SnO_2$ |
| 0.004-0.200 | $CeO_2$. |

Additionally, the glass composition should comply with the following relations:
($Li_2O+Al_2O_3$)/($Na_2O+K_2O$)>2,
0.47<$Li_2O$/($Li_2O+Na_2O+K_2O$)<0.70, and
0.8<$CaO+Fe_2O_3+ZnO+P_2O_5+B_2O_3+CeO_2$<3.

Moreover, LAS glasses according to the invention have a modulus of elasticity of at least 82 GPa, and preferably of at least 84 GPa.

The invention also comprises a method for producing lithium aluminosilicate glass articles, wherein first a melt is prepared from the above constituents in compliance with the relations and sums mentioned, from which subsequently a lithium aluminosilicate glass article is formed, in particular preferably using a float process.

In addition to the constituents mentioned above, the LAS glasses according to the invention may also include small amounts of several substances that were added for refining the melt.

The inventors have found that LAS glasses with a composition in these specific ranges and in compliance with the above relations exhibit particularly high moduli of elasticity. This is particularly surprising, since from prior art, for example from US 2008/0020919 A1, glasses are known that have similar compositions, but significantly lower moduli of elasticity. The inventors assume that the high moduli of elasticity are due to the specific limiting conditions of the glass composition, especially the alkali proportions claimed, and to the minor constituents which account for a proportion of the total composition from 0.8 to 3 mol %.

LAS glasses produced according to the composition described above are very well tempered chemically. Particularly preferred is an exchange of Li ions from the glass for monovalent cations having a larger ionic radius, for example from a salt melt. However, it is also possible to perform a multi-stage exchange process in which different cations such as Li, Na and/or K ions are preferably replaced in surface regions of different depths. Such a tempering process advantageously permits to produce tempered distributions with gradients from the interior of a LAS glass article outwardly to the surface of the LAS glass article.

In addition, advantageously, the LAS glass may be well suited for thermal tempering. To this end, preferably, it exhibits a linear coefficient of thermal expansion $\alpha_{(20-300)}$ ranging from $8.0*10^{-6} K^{-1}$ to $9.0*10^{-6} K^{-1}$.

Preferably, the LAS glass may be tempered using a conventional air tempering system for soda-lime glass with heat transfer coefficients from 200 to 500 W m$^{-2}$ K$^{-1}$ at a blowing pressure from 1 to 9 kPa. Such LAS glasses may advantageously be used as thermally tempered glass bodies for vehicle glazings.

Of course, thermal and chemical tempering may be employed in combination. Tempering advantageously increases the strength and scratch resistance of the glass, thus enlarging the application possibilities thereof.

According to a particularly preferred embodiment of the invention, an LAS glass has a glass transition point $T_g$ below 540° C., preferably a $T_g$ value between 500° C. and 540° C., and/or a working point $(V_A)$ at a viscosity of the melt of $10^4$ dPa·s of less than 1150° C., preferably between 900° C. and 1100° C. A low $T_g$ value and a low $V_A$ are very advantageous in terms of cost efficiency of the process. Both energy costs and heating time are reduced, and the stress on plant parts that come in contact with the melt or the hot glass is decreased. However, low glass transition points and working points are not a matter of course for very stiff glasses with a high modulus of elasticity, since these are generally very tough, highly viscous hard glasses. Therefore, the low glass transition points and working points of glasses having a high modulus of elasticity is one of the main advantages of the present invention.

The glass according to the invention comprises from 62 to 68 mol % of $SiO_2$. The term mol % in the context of the invention refers to a percentage amount of substance on a molar basis. $SiO_2$ constitutes the main network forming component of the glass and allows to obtain a stable glass.

If the $SiO_2$ content is below 62 mol %, the chemical resistance and the devitrification stability of the LAS glass are deteriorated. In contrast, $SiO_2$ contents of more than about 68 mol % result in undesirably high viscosities and a high glass transition point $T_g$. However, in particular a high $T_g$ value is technically and economically disadvantageous for melting and floating the glass, because it causes increased energy costs and involves higher stresses on the plant parts that come into contact with the melt, i.e. the melting vat and float bath.

An LAS glass according to the invention further comprises from 9 to 12 mol % of $Al_2O_3$. Besides $SiO_2$, aluminum oxide is an essential factor for the formation of the glass network. In contrast to $SiO_2$, however, $Al_2O_3$ promotes the diffusion of alkali ions during ion exchange, for example in chemical tempering processes. Thus it serves to increase ion exchangeability of the LAS glass to provide for obtaining high glass strengths by chemical tempering. However, $Al_2O_3$ contents of more than 12 mol % deteriorate the devitrification resistance and result in high melting and molding temperatures which can be detrimental, especially when the glass is formed by floating.

$P_2O_5$ is also counted among the network formers, however, it favors lower glass transition and working points. Thus it counteracts the $T_g$ increasing effect of $Al_2O_3$. In addition, $P_2O_5$ promotes the ion exchangeability of the glass.

Alkali oxides such as $Li_2O$, $Na_2O$, and $K_2O$, and boron trioxide $B_2O_3$ are added to float glasses in order to lower the viscosity. This is advantageous because lower viscosities also permit lower melting and molding temperatures and in particular lower float temperatures. However, $Na_2O$ contents should generally be below 10 mol %, since otherwise the diffusion of Na ions from the salt into the glass during chemical tempering would be excessively impaired in terms of thermodynamics. Moreover, too high contents of $Na_2O$ increase the coefficient of thermal expansion, which has a negative effect on the process stability during glass making, in particular in the lehr path.

Contents of $Na_2O$ below 8 mol % should be avoided because of the strong tendency of $Li_2O$ containing glass syntheses to crystallize: shaping by the float process may then be impeded by a strong crystal growth which results in top and bottom surface crystals. However, a certain amount of Na ions is particularly useful in case the glasses are to be chemically tempered, since the Na ions may be exchanged for K ions.

Potassium oxide should not be added to the glass, or should not exceed an analytical level of 0.5 wt %, since during chemical tempering the smaller Li ions are to be replaced by the larger Na and/or K ions from the exchange salt. Higher levels of K ions already existing in the glass network would interfere with this process. Moreover, due to its larger ionic diameter, $K_2O$ increases the thermal expansion of the glass even considerably stronger than $Na_2O$. On the other hand, potassium oxide contents below 0.02 wt % are hardly realized in cost efficient manner using the available technical resources.

Alkali oxides provide ion exchangeable cations for chemical tempering processes. In this context, $Li_2O$ should be particularly mentioned, because Li ions have a particularly good mobility in the glass matrix and therefore allow for high exchange rates at relatively low temperatures. Due to the rapid diffusion of the Li ions, the use of $Li_2O$ allows to produce high compressive stresses already with relatively small or thin surface tension layers. This combination results in high strengths, especially in case of thin glass sizes. In glass articles with ticker walls, the exchange of Li ions even allows to produce thick and therefore very strong layers of compressive stress. Of course, Na and K ions may likewise be used for ion exchange processes, but they generally require higher exchange temperatures.

For a good temperability, the alkali oxides should therefore largely be included in form of $Li_2O$. On the other hand, a too high content of $Li_2O$ deteriorates devitrification resistance and chemical resistance. At the same time, thermal expansion of the LAS glass increases as the $Li_2O$ content increases, which is detrimental for cooling the glass in the lehr path, and which deteriorates the cracking susceptibility upon temperature changes. Moreover, Li$_2$O is expensive. For these reasons, the content of Li$_2$O is limited to a maximum of 11.6 mol %.

Therefore, according to a particularly preferred embodiment of the invention, a chemically tempered LAS glass has a flexural strength ranging from 550 to 900 N/mm$^2$, as measured with the double ring method according to EN 1288-5.

A good ion exchangeability is given if the sum of the contents of Li$_2$O and Al$_2$O$_3$ exceeds the content of the larger alkali oxides Na$_2$O and K$_2$O by at least twice, i.e. (Li$_2$O+Al$_2$O$_3$)/(Na$_2$O+K$_2$O)>2.

Zirconium oxide is a network former similar to the SiO$_2$ and generally improves the chemical resistance of the LAS glass, but in particular its alkali resistance. This is advantageous when the articles produced from the glass are to be cleaned for example by means of an alkaline washing solution. Furthermore, due to the suggested ZrO$_2$ content the corrosive attack of the glass melt to the refractory material of the melting unit is reduced, thereby increasing the operating life thereof.

Generally, however, the proportion of ZrO$_2$ is limited to a maximum level of 3 mol %, since it is a glass component which is extremely difficult to melt and which increases the susceptibility to crystallization of the LAS glass. Also, not melted ZrO$_2$ residues may cause spontaneous fractures in the glass during thermal tempering. Moreover, in floated LAS glass articles unwanted surface defects may result. Zirconium oxide is used in glass ceramic manufacturing as a nucleating agent and, upon contact of the glass surface with the tin bath during the float process, may cause a crystallization of high-quartz mixed crystals sized up to several 100 μm in the surface region of the glass.

Alkaline earth oxides such as MgO, CaO, and SrO as well as zinc oxide ZnO may be added to improve devitrification resistance and segregation stability. Generally, an number as large as possible of different components enhances the devitrification stability of glasses. This fact is accounted for by the sum of the constituents that make up only small amounts of the total composition:
0.8<CaO+Fe$_2$O$_3$+ZnO+P$_2$O$_5$+B$_2$O$_3$+CeO$_2$<3.

However, alkaline earth oxides and zinc oxide should only be added in small amounts, since they hinder the diffusion of alkali ions. This in turn would cause longer ion exchange durations to achieve a predefined surface tension. Therefore, an addition of MgO and SrO is completely dispensed with. However, the glasses may contain traces of these compounds which are introduced into the glass due to unavoidable impurities in the glass raw materials, or by contamination from glasses previously melted in the same pot, or by dissolution from the refractory materials of the jamb blocks. CaO and ZnO, however, may be added in small amounts.

The glass should not include any As$_2$O$_3$ nor Sb$_2$O$_3$ as a refining agent, due to their incompatibility with the float process, and not least for environmental reasons. Under the highly reducing conditions of the float bath atmosphere, the oxides might be reduced to the elemental metals and the glass might have undesired and not removable surface discolorations.

Therefore, instead, a combination of the polyvalent oxides SnO$_2$, CeO$_2$, and Fe$_2$O$_3$ may be used for refining. According to a particularly preferred embodiment of the invention, at least two oxides selected from the group of SnO$_2$, CeO$_2$, and Fe$_2$O$_3$ should be used for refining, in a minimum amount of 0.1 mol %. However, the SnO$_2$ content should not exceed an upper limit of 0.5 wt %, otherwise glass defects would significantly increase due to evaporation and condensation phenomena. Moreover, the tendency to devitrification of the LAS glass disproportionately increases with higher SnO$_2$ contents.

However, an SnO$_2$ content of not more than 0.5 wt % is not sufficient to produce a bubble-free glass. By combining SnO$_2$ with CeO$_2$ and/or Fe$_2$O$_3$, this drawback may surprisingly be compensated for.

Therefore, according to a particularly preferred embodiment of the invention, the proportion of the constituents SnO$_2$, CeO$_2$, and Fe$_2$O$_3$ in the total composition of the LAS glass may be greater than 0.1 mol %, i.e. SnO$_2$+CeO$_2$+Fe$_2$O$_3$>0.1.

However, the use of CeO$_2$ and Fe$_2$O$_3$ causes a coloration of the glass. Depending on the use, this coloration can be more or less annoying, or may even be intentional. The green coloring, for example, which is produced when using iron oxide, acts as a filter in the infrared wavelength range. This has proven to be advantageous for example for vehicle glazing. In summer, there will be less heating of the vehicle interior by the sun. In winter, by contrast, heat losses to the environment are reduced.

Furthermore, a certain amount of Fe$_2$O$_3$ is also beneficial if thermal coupling is necessary during post-processing. For example by an addition of iron oxide the temperature required for bending a glass sheet may be reached more quickly.

A drawback of the use of CeO$_2$ and Fe$_2$O$_3$ as a refining agent, however, is the fact that these oxides together with TiO$_2$ form strongly brown coloring color complexes. For this reason, TiO$_2$ should not be a regular constituent of the LAS glass. Also, raw materials with an TiO$_2$ content as low as possible are preferred. According to a preferred embodiment of the invention, the LAS glass should also be free of MgO and/or As$_2$O$_3$ and/or Sb$_2$O$_3$ and/or V$_2$O$_5$ and/or Bi$_2$O$_3$ and/or PbO.

The CeO$_2$ content is limited to a maximum of 0.112 mol %, since this oxide would otherwise cause excessive fluorescence of the glass and a yellowish color.

As another refining additive, optionally, a fluoride may be added, for example in form of CaF$_2$, or Na$_2$SiF$_6$. Even very low fluoride contents of 0.025 wt % of F$^-$ facilitate the melting of the batch carpet. Excessive fluoride contents, however, degrade the achievable levels for chemical tempering and may cause opacity of the LAS glass.

Alternatively or additionally, the glass melt may be refined using a halide salt such as NaCl or KCl in common refining agent concentrations, for example from 0.2 to 2.0 wt %.

Moreover, refining may be accomplished using a physical refining process, for example high-temperature refining, with or without the use of refining agents such as NaCl, KCl, sulfate, etc.

Additionally or alternatively, it is possible for the glass melt to be refined by addition of sulfates, e.g. Na$_2$SO$_4$, in common refining agent concentrations, for example, from 0.01 to 0.5 wt %.

Furthermore, the LAS glass according to one embodiment of the invention may have a density of less than 2.50 g/cm$^{3+}$ According to a particularly preferred embodiment of the invention, the LAS glass has a composition, in mol %, from the following ranges:

| | |
|---|---|
| 62-68 | SiO$_2$ |
| 10-12 | Al$_2$O$_3$ |
| 0.0-0.7 | B$_2$O$_3$ |
| 10.1-11.1 | Li$_2$O |
| 8.6-9.8 | Na$_2$O |
| 0.0-0.3 | K$_2$O |
| 0.00-0.08 | MgO |
| 0.5-1.7 | CaO |
| 0.0-0.2 | ZnO |
| 1.5-2.1 | ZrO$_2$ |

-continued

| | |
|---|---|
| 0.0-0.3 | $P_2O_5$ |
| 0.003-0.080 | $Fe_2O_3$ |
| 0.05-0.30 | $SnO_2$ |
| 0.04-0.10 | $CeO_2$. |

According to another preferred embodiment of the invention, the LAS glass has a composition, in mol %, from the following ranges:

| | |
|---|---|
| 63-67 | $SiO_2$ |
| 10.8-11.5 | $Al_2O_3$ |
| 0.1-0.6 | $B_2O_3$ |
| 10.3-10.8 | $Li_2O$ |
| 9.0-9.5 | $Na_2O$ |
| 0.1-0.3 | $K_2O$ |
| 0.00-0.05 | $MgO$ |
| 0.6-1.4 | $CaO$ |
| 0.0-0.1 | $ZnO$ |
| 1.6-2.0 | $ZrO_2$ |
| 0.0-0.1 | $P_2O_5$ |
| 0.003-0.080 | $Fe_2O_3$ |
| 0.1-0.2 | $SnO_2$ |
| 0.04-0.07 | $CeO_2$. |

The scope of the invention further comprises lithium aluminosilicate glass articles which are producible or produced using the method described above. These LAS glass articles may be manufactured in different thicknesses, so as to satisfy different requirements. By floating, for example, common window panes thicknesses can be produced, e.g. from 3 to 6 mm. However, it is also possible by floating to produce very thin material, for example thicknesses from 0.4 to 0.7 mm, which is typical for control elements of touch panels. Of course, other shaping processes appropriate for shaping the LAS glasses likewise fall within the scope of the invention, for example drawing processes such as down draw, draw up, overflow fusion, and Fourcault processes, etc.

The LAS glass articles may advantageously be used in applications where high glass stiffness is required. Particularly advantageous are applications where a high stiffness of the article is important and these articles are mass produced. In those cases, the comparatively low energy costs and the low and therefore low stressing glass transition points and working points, are of particular significance.

Particularly preferable, these lithium aluminosilicate glass articles are used as high-strength panes or glazing in areas where high compressive strength and stiffness are required, in particular as glass bodies for vehicle glazings, as substrates for electronic or solar modules, as components in solar technology, as control elements of touchpad or touch panel devices, as substrates for hard disks, as a cover or display for mobile communication devices.

DETAILED DESCRIPTION

The invention will now be described in more detail with reference to exemplary embodiments.

For some embodiments, Table 1 lists compositions and properties of flat float glasses.

The LAS glasses in Table 1 were melted from common glass raw materials in accordance with the above mentioned compositions, in a platinum crucible at about 1620° C., and were homogenized. Sheets of 6 mm thickness were produced in a float line. From these sheets, test samples such as rods or plates were cut for determining the physical and mechanical properties.

For some molten glasses, the density, the linear coefficient of thermal expansion between 20° C. and 300° C., the transformation point, the viscosity at $10^{13}$, $10^{7.6}$, and $10^4$ dPa·s, and the Knoop hardness $HK_{0.1/20}$ according to DIN 9385 were determined. Also, the modulus of elasticity and the shear modulus were determined by the common rod bending method.

Following chemical tempering, which was accomplished using a $NaNO_3$ melt, at 370° C. to 400° C. for 15 to 20 hours, the flexural strength (MOR=modulus of rupture) was measured by the double ring method according to EN 1288-5, as well as the depth of the surface tension layer (penetration depth).

In addition, molten samples of LAS glasses of a sample size of about 2.5 liters of melt volume each were cast to the edge of a glass sheet in the hot zone of a float bath, in order to allow for assessing potential discolorations due to the strongly reducing float bath atmosphere and thereby to draw conclusions about the workability of the glasses in a float process. None of the LAS glasses listed in Table 1 had crystals, after having been exposed to the float bath for 10 minutes at temperatures between 600° C. and 1100° C. Thus, the LAS glasses exhibit an extremely low tendency to crystallize and hence are easily processed using the float technique.

Table 2 shows aluminosilicate glasses, which are known from prior art. The data of these glasses have been taken from DE 10 2004 022 629 B9, Table 1, glass 1, and from DE 42 06 268 C2, Table 1, Example 4.

TABLE 1

| | glass 1 (mol %) | glass 2 (mol %) | glass 3 (mol %) |
|---|---|---|---|
| $SiO_2$ | 64.74 | 64.95 | 65.40 |
| $B_2O_3$ | 0.14 | 0.18 | 0.55 |
| $Al_2O_3$ | 11.05 | 11.07 | 11.07 |
| $Li_2O$ | 10.85 | 10.66 | 10.29 |
| $Na_2O$ | 9.75 | 9.66 | 8.28 |
| $K_2O$ | 0.05 | 0.05 | 0.07 |
| $P_2O_5$ | 0.01 | 0.03 | 0.18 |
| $CaO$ | 0.67 | 0.84 | 1.36 |
| $SrO$ | 0.04 | 0.05 | 0.11 |
| $ZnO$ | 0.05 | 0.06 | 0.12 |
| $ZrO_2$ | 1.84 | 1.84 | 1.95 |
| $CeO_2$ | 0.04 | 0.04 | 0.06 |
| $SnO_2$ | 0.04 | 0.04 | 0.04 |
| $Fe_2O_3$ | 0.04 | 0.04 | 0.03 |
| $(Li_2O + Al_2O_3)/(Na_2O + K_2O)$ | 2.23 | 2.24 | 2.56 |
| $Li_2O/(Li_2O + Na_2O + K_2O)$ | 0.53 | 0.52 | 0.55 |
| $CaO + Fe_2O_3 + ZnO + P_2O_5 + B_2O_3 + CeO_2$ | 0.95 | 1.19 | 2.3 |
| $\alpha_{(20-300)}$ ($10^{-6}$ $K^{-1}$) | | 8.50 | |
| $T_g$ (° C.) | | 505 | |
| Density (g/cm³) | | 2.4884 | |
| T 13 (dPa · s) | | 515 | |
| T 7,6 (dPa · s) | | 718 | |
| T 4 (dPa · s) | | 1066 | |
| Crystallization | | non | |
| Modulus of elasticity (GPa) | | 83.3 | |
| Shear modulus (GPa) | | 34.1 | |

TABLE 2

| | glass 4 (mol %) | glass 5 (mol %) |
|---|---|---|
| $SiO_2$ | 57.17 | 60.99 |
| $B_2O_3$ | | |
| $Al_2O_3$ | 34.14 | 19.78 |
| $Li_2O$ | 1.82 | 3.57 |
| $Na_2O$ | 0.44 | 4.63 |

TABLE 2-continued

|  | glass 4 (mol %) | glass 5 (mol %) |
|---|---|---|
| $K_2O$ | 0.15 | |
| $P_2O_5$ | 1.63 | |
| MgO | 0.92 | |
| CaO | | |
| SrO | | |
| ZnO | 0.70 | |
| $ZrO_2$ | 1.76 | 11.04 |
| $CeO_2$ | | |
| $SnO_2$ | 1.08 | |
| $Fe_2O_3$ | | |
| $F^-$ | 0.19 | |
| $SO_3^{2-}$ | | |
| $(Li_2O + Al_2O_3)/(Na_2O + K_2O)$ | 60.32 | 5.05 |
| $Li_2O/(Li_2O + Na_2O + K_2O)$ | 0.75 | 0.44 |
| $CaO + Fe_2O_3 + ZnO + P_2O_5 + B_2O_3 + CeO_2$ | 2.51 | 0.00 |
| $\alpha_{(20-300)} (10^{-6} K^{-1})$ | 4.16 | 7.36 |
| $T_g$ (° C.) | 645 | 504 |
| Density (g/cm$^3$) | 2.406 | 2.455 |
| T 13 (dPa · s) | | |
| T 7,6 (dPa · s) | | |
| T 4 (dPa · s) | 1307 | 1078 |
| Crystallization | | |
| Modulus of elasticity (GPa) | 85 | 86 |

A comparison of the LAS glasses covered by the invention (Table 1) with the prior art glasses (Table 2) shows that the prior art glasses in some respects meet the requirements on the modulus of elasticity (>82 GPa), low glass transition point (<540° C.) and low working point (<1150° C.), and also the claimed alkali ratios:
$(Li_2O+Al_2O_3)/(Na_2O+K_2O)>2$;
$0.47<Li_2O/(Li_2O+Na_2O+K_2O)<0.70$.

However, in no case the advantageous features are all together present in the claimed combination. Moreover, in none of the cases the following relation is complied with: $0.8<CaO+Fe_2O_3+ZnO+P_2O_5+B_2O_3+CeO_2<3$, with at least four of the six oxides included.

Glass 4 has a ratio $(Li_2O+Al_2O_3)/(Na_2O+K_2O)$ which is greater than two, as claimed. The modulus of elasticity is 85 GPa, i.e. high.

However, the glass only includes a total of about 3.6 mol % of ion-exchangeable alkali oxides, i.e. small amounts, which causes a comparatively small temperability—solely due to the small number of theoretically exchangeable ions.

The proportion of $Li_2O$ to the total amount of alkali oxides is 0.75, i.e. larger than the claimed range. The $T_g$ and $V_A$ values are 645° C. and 1307° C., respectively, i.e. very high, which is energy intensive and involves high material stress.

The content of minor constituents is greater than suggested according to the claimed range and is only provided by two different oxides. Moreover, the $Al_2O_3$ content of the glass is 34.14 mol %, i.e. very high. Given this combination it can be assumed that the glass has a relatively high devitrification tendency, especially when being shaped using a float process.

In addition, the linear coefficient of thermal expansion of the glass is $4.16*10^{-6} K^{-1}$ and thus relatively high, so that breaking of the glass is more likely to occur, for example in the lehr path.

Glass 5 from Table 2 has a $(Li_2O+Al_2O_3)/(Na_2O+K_2O)$ ratio greater than two. Also, the $T_g$ and $V_A$ values are 504° C. and 1078° C., respectively and thus fall into the claimed range.

The modulus of elasticity is 86 GPa, i.e. high.

The proportion of $Li_2O$ to the total amount of alkali oxides is below the claimed range. Thus, the glass has a relatively low percentage of $Li_2O$ and is therefore not optimized for the Li ion exchange in chemical tempering.

Minor constituents such as CaO, $Fe_2O_3$, ZnO, $P_2O_5$, $B_2O_3$, or $CeO_2$ are not included. Moreover, the $Al_2O_3$ content is about 20 mol %, i.e. relatively high. Given this combination it can be assumed that this glass has a relatively high tendency to devitrification and therefore is only poorly suited for being floated. Moreover it includes 11.04 mol % of $ZrO_2$, i.e. much, which may result in a heavy formation of high-quartz mixed crystals at the surface of the glass during floating.

Therefore, although the glasses known from prior art are in part suitable for chemical tempering, it can be assumed that they do not exhibit an optimum devitrification resistance which however is crucial for shaping by means of a float process. Also, the glass compositions are not optimized for Li ion exchange for the purposes of chemical tempering.

It is in particular the claimed combination of oxide ratios along with the other glass components, which allow to produce LAS glasses that have a high stiffness and low $T_g$ and $V_A$ values, which are produced by means of the cost efficient float process and due to chemical and/or thermal tempering exhibit flexural strengths of more than 500 N/mm². In other words, an LAS glass is described here for the first time, which has a high stiffness and high flexural strength, but can still be produced in cost and time efficient manner.

The invention claimed is:

1. A lithium aluminosilicate glass, comprising a composition, in mol %, of:

| | |
|---|---|
| $SiO_2$ | 60-70; |
| $Al_2O_3$ | 10-13; |
| $B_2O_3$ | 0.0-0.9; |
| $Li_2O$ | 9.6-11.6; |
| $Na_2O$ | 8.2-less than 10; |
| $K_2O$ | 0.0-0.7; |
| MgO | 0.0-0.2; |
| CaO | 0.2-2.3; |
| ZnO | 0.0-0.4; |
| $ZrO_2$ | 1.3-2.6; |
| $P_2O_5$ | 0.0-0.5; |
| $Fe_2O_3$ | 0.003-0.100; |
| $SnO_2$ | 0.0-0.3; and |
| $CeO_2$ | 0.004-0.200, | wherein said composition is in compliance with the following relations:
$(Li_2O+Al_2O_3)/(Na_2O+K_2O)$ greater than 2;
$Li_2O/(Li_2O+Na_2O+K_2O)$ greater than 0.47 and less than or equal to 0.586;
$CaO+Fe_2O_3+ZnO+P_2O_5+B_2O_3+CeO_2$ greater than 0.8 and less than 3 with at least four out of six oxides included; and
wherein said lithium aluminosilicate glass exhibits a modulus of elasticity of at least 82 GPa and has a glass transition point $T_g$ of less than 540° C. and/or a working point of less than 1150° C.

2. The lithium aluminosilicate glass as claimed in claim 1, wherein said lithium aluminosilicate glass is suitable for shaping by a float process.

3. The lithium aluminosilicate glass as claimed in claim 2, wherein said lithium aluminosilicate glass can be chemically and/or thermally tempered so that it has a flexural strength of at least 550 N/mm², as measured with a double ring method according to EN 1288-5.

4. The lithium aluminosilicate glass as claimed in claim 3, wherein said lithium aluminosilicate glass is chemically tempered by exchanging Li ions for ions having a greater ionic radius.

5. The lithium aluminosilicate glass as claimed in claim 1, further comprising a linear coefficient of thermal expansion $\alpha_{(20-300)}$ between $8.0*10^{-6} K^{-1}$ and $9.0*10^{-6} K^{-1}$.

6. The lithium aluminosilicate glass as claimed in claim 1, wherein at least two components from a group of refining components consisting of $Fe_2O_3$, $CeO_2$, and $SnO_2$ together account for at least 0.1 mol % of said composition.

7. The lithium aluminosilicate glass as claimed in claim 6, wherein said lithium aluminosilicate glass is free of $TiO_2$ and/or MgO and/or $As_2O_3$ and/or $Sb_2O_3$ and/or $V_2O_5$ and/or $Bi_2O_3$ and/or PbO, except for technically or economically unavoidable residues in glass raw materials.

8. The lithium aluminosilicate glass as claimed in claim 1, wherein $SnO_2$ is present in a content of not more than 0.5 wt %.

9. The lithium aluminosilicate glass as claimed in claim 1, wherein said composition comprises:

| | |
|---|---|
| $SiO_2$ | 62-68; |
| $Al_2O_3$ | 10-12; |
| $B_2O_3$ | 0.0-0.7; |
| $Li_2O$ | 10.1-11.1; |
| $Na_2O$ | 8.6-9.8; |
| $K_2O$ | 0.0-0.3; |
| MgO | 0.00-0.08; |
| CaO | 0.5-1.7; |
| ZnO | 0.0-0.2; |
| $ZrO_2$ | 1.5-2.1; |
| $P_2O_5$ | 0.0-0.3; |
| $Fe_2O_3$ | 0.003-0.080; |
| $SnO_2$ | 0.05-0.30; and |
| $CeO_2$ | 0.04-0.10. |

10. The lithium aluminosilicate glass as claimed in claim 1, wherein said composition comprises:

| | |
|---|---|
| $SiO_2$ | 63-67; |
| $Al_2O_3$ | 10.8-11.5; |
| $B_2O_3$ | 0.1-0.6; |
| $Li_2O$ | 10.3-10.8; |
| $Na_2O$ | 9.0-9.5; |
| $K_2O$ | 0.1-0.3; |
| MgO | 0.00-0.05; |
| CaO | 0.6-1.4; |
| ZnO | 0.0-0.1; |
| $ZrO_2$ | 1.6-2.0; |
| $P_2O_5$ | 0.0-0.1; |
| $Fe_2O_3$ | 0.003-0.080; |
| $SnO_2$ | 0.1-0.2; and |
| $CeO_2$ | 0.04-0.07. |

11. The lithium aluminosilicate glass as claimed in claim 1, wherein said lithium aluminosilicate glass is suitable for use as a high-strength pane or glazing having high compressive strengths and stiffness.

12. The lithium aluminosilicate glass as claimed in claim 1, wherein said lithium aluminosilicate glass is suitable for use as an article selected from the group consisting of a glass body for vehicle glazings, as a substrate for electronic modules, as a substrate for solar modules, as a component for solar modules, as a control element of touchpad or touch panel device, as a substrate for a hard disk, and as a cover or display for a mobile telecommunications device.

13. A method for producing a lithium aluminosilicate glass article having a modulus of elasticity of at least 82 GPa and a glass transition point below 540° C. and/or a working point below 1150° C., comprising:

preparing a glass melt having a composition, in mol %, of:

| | |
|---|---|
| $SiO_2$ | 60-70; |
| $Al_2O_3$ | 10-13; |
| $B_2O_3$ | 0.0-0.9; |
| $Li_2O$ | 9.6-11.6; |
| $Na_2O$ | 8.2-less than 10; |
| $K_2O$ | 0.0-0.7; |
| MgO | 0.0-0.2; |
| CaO | 0.2-2.3; |
| ZnO | 0.0-0.4; |
| $ZrO_2$ | 1.3-2.6; |
| $P_2O_5$ | 0.0-0.5; |
| $Fe_2O_3$ | 0.003-0.100; |
| $SnO_2$ | 0.0-0.3; and |
| $CeO_2$ | 0.004-0.200, | wherein said composition is in compliance with the following relations:

$(Li_2O+Al_2O_3)/(Na_2O+K_2O)$ greater than 2;

$Li_2O/(Li_2O+Na_2O+K_2O)$ greater than 0.47 and less than or equal to 0.586;

$CaO+Fe_2O_3+ZnO+P_2O_5+B_2O_3+CeO_2$ greater than 0.8 and less than 3; and forming said lithium aluminosilicate glass article by a float process.

14. The method as claimed in claim 13, wherein at least two components from a group of refining components consisting of $Fe_2O_3$, $CeO_2$, and $SnO_2$ together account for at least 0.1 mol % of said composition.

15. The method as claimed in claim 13, further comprising adding in halogenide salts refining components in a range from 0.2 to 2.0 wt % of said composition.

16. The method as claimed in claim 15, wherein said halogenide salts comprise NaCl and/or KCl.

17. The method as claimed in claim 13, further comprising adding a sulfate to said composition as a refining component.

18. The method as claimed in claim 17, further comprising thermally tempering said lithium aluminosilicate glass article.

19. The method as claimed in claim 18, wherein the step of thermally tempering comprise using a conventional air tempering system for soda-lime glass with heat transfer coefficients from 200 to 500 W m$^{-2}$ K$^{-1}$ at a blowing pressure from 1 to 9 kPa.

20. The method as claimed in claim 17, further comprising chemically tempering said lithium aluminosilicate glass article by exchanging Li ions from said lithium aluminosilicate glass for ions having a greater ionic radius.

* * * * *